United States Patent [19]
Saurette

[11] Patent Number: 5,862,657
[45] Date of Patent: Jan. 26, 1999

[54] BRACKET FOR SUPPORTING A CROP DIVIDER ON A WHEEL ASSEMBLY OF AN AGRICULTURAL VEHICLE

[75] Inventor: Roger Amedee Saurette, Aubigney, Canada

[73] Assignee: Terraflex AG Service Inc., Niverville, Canada

[21] Appl. No.: 801,090

[22] Filed: Feb. 14, 1997

[51] Int. Cl.⁶ .......................... A01D 45/02; A01B 35/32
[52] U.S. Cl. .................... 56/119; 56/DIG. 20; 172/833; 172/517; 37/263
[58] Field of Search ............................... 56/119, 1, 17.4, 56/DIG. 9, DIG. 20, DIG. 24; 305/107; 172/508, 510, 517, 624.5, 833; 37/263

[56] References Cited

U.S. PATENT DOCUMENTS

| | | | |
|---|---|---|---|
| 1,739,577 | 12/1929 | Cantu | 301/37.25 X |
| 2,179,793 | 11/1939 | Lewison . | |
| 2,635,516 | 4/1953 | Patterson . | |
| 2,663,240 | 12/1953 | Bauer . | |
| 3,543,493 | 12/1970 | Duda, Jr. | 56/121.46 X |
| 5,588,715 | 12/1996 | Harlen | 301/37.25 |

*Primary Examiner*—Heather Shackelford
*Attorney, Agent, or Firm*—Adrian D. Battison; Murray E. Thrift

[57] ABSTRACT

A high clearance agricultural sprayer of the type including a ground wheel mounted on a vertical section of an axle with a hub having a hydraulic motor for driving the ground wheel has an accessory mounted on the ground wheel using an inner bracket attached to the bottom of the vertical section of the axle and an outer bracket attached on the cylindrical surface of the hub. The outer bracket includes a cylindrical sleeve having a shaft on an end face of the sleeve and the bearing surrounding the shaft. The system can be used to support a crop divider carried on the ground wheel by a pair of arms each extending forwardly from their respective brackets for pivotal movement about the axis of the wheel such that the crop divider comprises a pair of frames which extend forwardly each in a respective arm to a front apex where the frame is being covered by plastic cover sheets. A central ground wheel is carried on one of the frames and carries a forward end of the crop divider for defining the height of the crop divider to the ground.

23 Claims, 4 Drawing Sheets

BRACKET FOR SUPPORTING A CROP DIVIDER ON A WHEEL ASSEMBLY OF AN AGRICULTURAL VEHICLE

This invention relates to a crop divider for mounting on the wheel assembly of an agricultural vehicle and to a bracket arrangement which is particularly but not exclusively designed for use with the crop divider which enables the crop divider to be supported on an outer side of the wheel.

BACKGROUND OF THE INVENTION

In recent years developments have been made in agricultural processes which require the spreading of chemicals in liquid or granular form onto the crop at various stages during the crop's development including pre-emergene, post-emergence and pre-harvesting. Machines have been developed which are suitable for movement across the grand during these different stages. Such machines generally have a relatively high clearance so they have raised axles and relatively large narrow tires so that the tires can move over the ground without the frame of the vehicle damaging the crop and at the same time minimizing damage to the crop from impact by the wheels.

In the situation where the crop has emerged or has developed, it is desirable to provide crop dividers on at least the front wheels of the vehicle so that, ahead of the wheels, the crop is separated or divided so that it passes to restricted sides of the wheel while minimizing the damage to the crop. Various designs of a crop divider have been developed. Such crop dividers have the appearance of fenders with a relatively sharp leading edge in front of the wheel and two side surfaces which extend rearwardly from the leading edge to the respective sides of the wheel.

Until now this crop divider arrangement has generally been mounted on a bracket system attached to the support structure for the wheel on the inside of the wheel only. Generally machines of this type include a vertical axle portion of an outer end of a horizontal axle portion with a wheel hub mounted at the lower end of the vertical axle portion. In general the bracket is attached to the vertical axle portion with intention that the structure of the crop divider is supported from this bracket only.

This arrangement has had the disadvantage that the crop divider is difficult to support by this single bracket thus limiting the size and effectiveness of the crop divider which can be used.

SUMMARY OF THE INVENTION

It is one object of the present invention, therefore, to provide an improved bracket arrangement for mounting a member of this type on the wheel assembly of an agricultural vehicle.

It is a further object of the invention to provide an improved crop divider for an agricultural vehicle.

According to one aspect of the invention there is provided a vehicle wheel assembly comprising: a ground wheel having a wheel disc defining an inner side of the wheel and an outer side of the wheel, a wheel rim at a peripheral edge of the wheel disc and a tire mounted on the wheel rim; a wheel support assembly on the inner side of the wheel for attachment of the wheel to a vehicle body; a wheel hub assembly mounted on the wheel support assembly for mounting the wheel for rotation about a wheel axis centrally of the wheel and passing horizontally through the wheel support assembly; the wheel hub assembly including a cylindrical housing projecting from the wheel disc to the outer side of the wheel disc with a longitudinal axis of the cylindrical housing lying along the wheel axis; a member carried by the wheel assembly; and a mounting bracket assembly for supporting the member on the wheel, the mounting bracket assembly comprising: a cylindrical sleeve mounted on an outer peripheral surface of the cylindrical housing; a bracket attached to the member; and a bearing attaching the bracket to the sleeve and allowing rotation of the sleeve and the wheel about the wheel axis while the bracket and the member remain stationary.

Preferably the sleeve includes a longitudinal slot and clamping members for tightening the sleeve onto the peripheral surface by reducing a width of the slot.

Preferably the sleeve includes an end wall opposite to the wheel disc and generally parallel thereto closing the adjacent end of the sleeve and wherein the bearing is mounted on a shaft carried by the end wall.

Preferably there is provided a second mounting bracket mounted on the wheel support assembly on the inner side of the wheel such that the mounting bracket and the second mounting bracket both provide support to the member.

Preferably there is provided a drive assembly for driving the hub assembly including a hydraulic drive motor mounted on the wheel support assembly and a gear transmission wherein the gear transmission is mounted in the cylindrical housing.

According to a second aspect of the invention there is provided a crop divider and wheel assembly for an agricultural vehicle comprising: a ground wheel having a wheel disc defining an inner side of the wheel and an outer side of the wheel, a wheel rim at a peripheral edge of the wheel disc and a tire mounted on the wheel rim; a wheel support assembly on the inner side of the wheel for attachment of the wheel to a vehicle body; a wheel hub assembly mounted on the wheel support assembly for mounting the wheel for rotation about a wheel axis centrally of the wheel and passing horizontally through the wheel support assembly; the wheel hub assembly including a housing member projecting from the wheel disc to the outer side of the wheel disc; the crop divider comprising a frame, crop engaging surfaces mounted on the frame so as to engage a standing crop in front of the wheel and to deflect the crop to the respective inner and outer sides of the wheel; a mounting bracket assembly for supporting the crop divider on the wheel, the mounting bracket assembly comprising: an attachment member mounted on the housing member; a first mounting bracket attached to the frame of the crop divider; a bearing attaching the bracket to the attachment member and allowing rotation of the housing member and the wheel about the wheel axis while the bracket and the crop divider remain stationary; a second mounting bracket mounted on the wheel support assembly on the inner side of the wheel, the frame of the crop divider being attached to the second mounting bracket for support thereby.

Preferably the second mounting bracket mounts the frame for pivotal movement about the wheel axis such that the first mounting bracket and the second mounting bracket both provide support to the crop divider and allow lifting and lowering movement of the crop divider relative to the wheel.

Preferably the crop divider includes a leading edge located forwardly of the wheel, which leading edge extends generally upwardly and rearwardly to a position above the wheel and wherein the surfaces diverge rearwardly and outwardly from the front edge.

Preferably there is provided a guide plate member mounted at the front edge and extending forwardly therefrom.

Preferably there is provided a subsidiary ground wheel attached to the frame forwardly of the applicator ground wheel for supporting the frame relative to the ground.

Preferably there is provided a lift system for pivoting the crop divider around the wheel axis.

Preferably the lift system comprises a cable winch and a cable or a hydraulic cylinder having an outer end attached to the crop divider for pulling the crop divider upwardly and rearwardly.

Preferably the housing member is cylindrical with a longitudinal axis of the cylindrical housing member lying along the wheel axis and wherein the attachement member comprises a cylindrical sleeve mounted on an outer peripheral surface of the cylindrical housing member.

Preferably the sleeve includes a longitudinal slot and clamping members for tightening the sleeve onto the peripheral surface by reducing a width of the slot.

Preferably the sleeve includes an end wall opposite to the wheel disc and generally parallel thereto closing the adjacent end of the sleeve and wherein the bearing is mounted on a shaft carried by the end wall.

Preferably there is provided a drive assembly for driving the hub assembly including a hydraulic drive motor mounted on the wheel support assembly and a gear transmission wherein the gear transmission is mounted in the cylindrical housing.

According to a third aspect of the invention there is provided a crop divider and wheel assembly for an agricultural vehicle comprising: a ground wheel having a wheel disc defining an inner side of the wheel and an outer side of the wheel, a wheel rim at a peripheral edge of the wheel disc and a tire mounted on the wheel rim; a wheel support assembly on the inner side of the wheel for attachment of the wheel to a vehicle body; a wheel hub assembly mounted on the wheel support assembly for mounting the wheel for rotation about a wheel axis centrally of the wheel and passing horizontally through the wheel support assembly; the crop divider comprising a frame, crop engaging surfaces mounted on the frame so as to engage a standing crop in front of the wheel and to deflect the crop to the respective inner and outer sides of the wheel as the wheel moves through the crop; a mounting bracket assembly for supporting the crop divider on the wheel; and a subsidiary ground wheel attached to the frame forwardly of the ground wheel for supporting the frame relative to the ground.

One embodiment of the invention will now be described in conjunction with the accompanying drawings in which:

BRIEF DESCRIPTION OF THE DRAWINGS

FIG. 5 is a view along the lines 5—5 of FIG. 3.

In the drawings like characters of reference indicate corresponding parts in the different figures.

DETAILED DESCRIPTION

Figure 1:
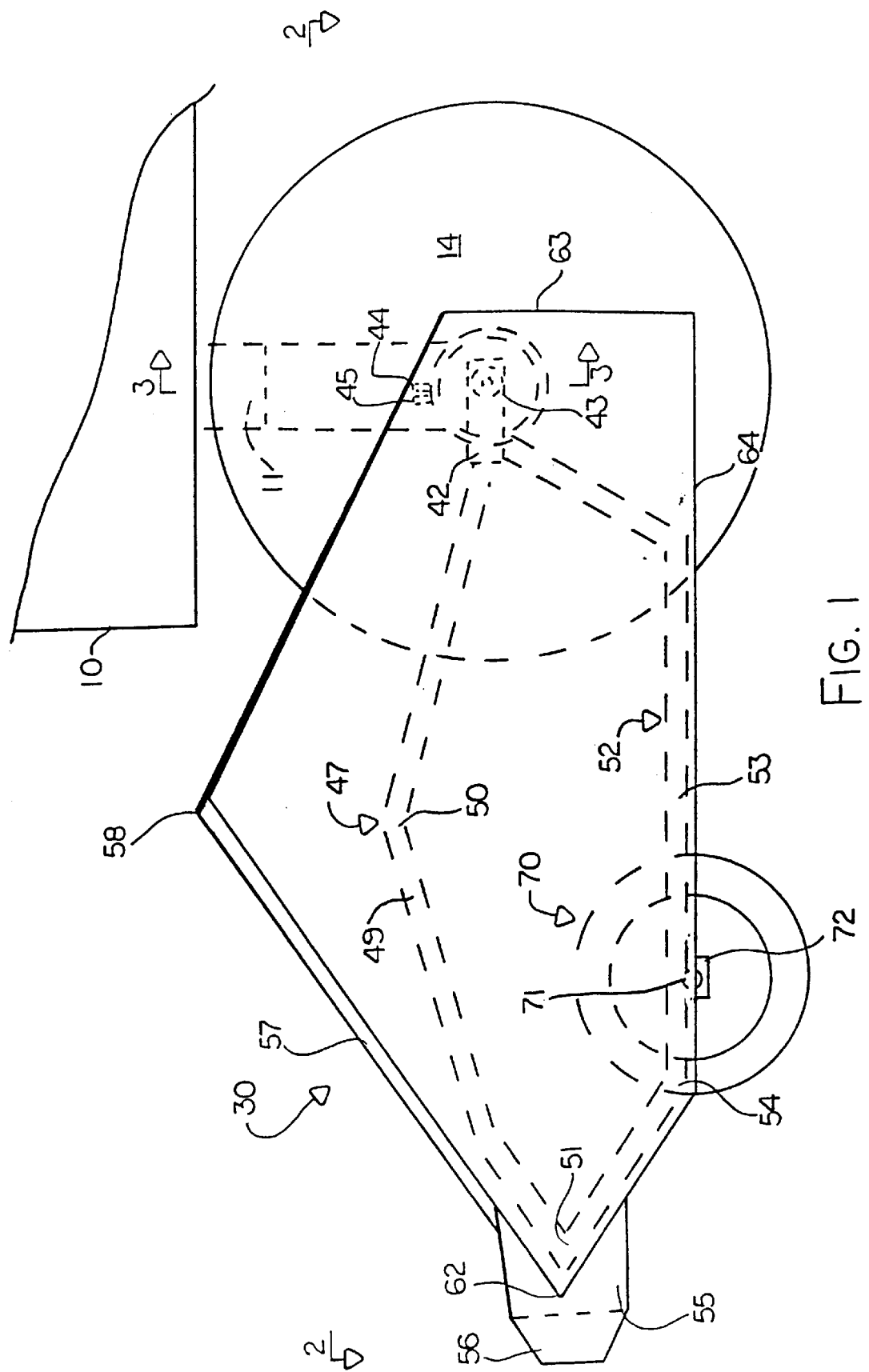
FIG. 1 is a side elevational view of one front wheel and a crop divider mounted on that front wheel for an agricultural vehicle.
Figure 2:
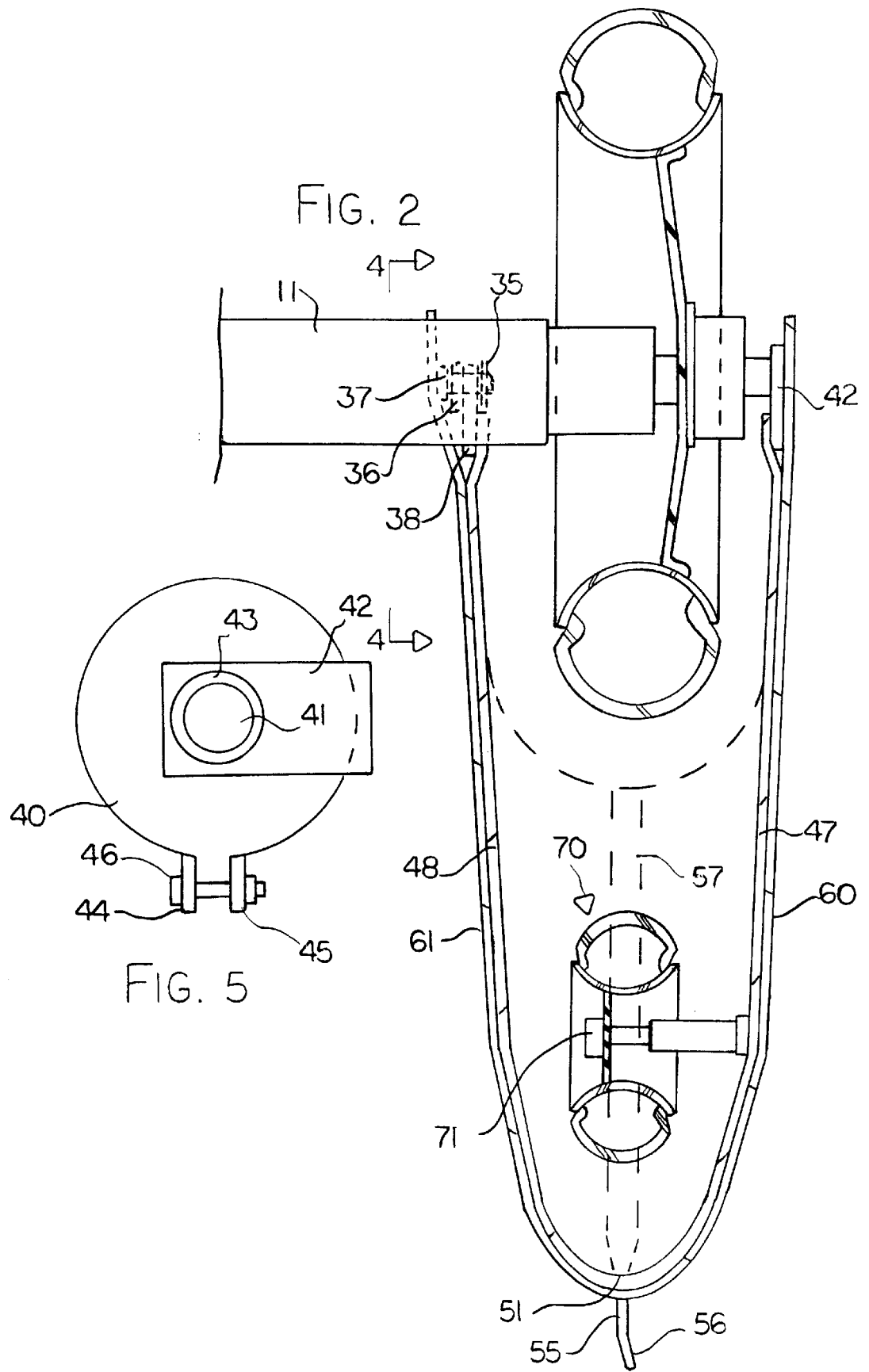
FIG. 2 is a view along the lines 2—2 of FIG. 1.
Figure 3:
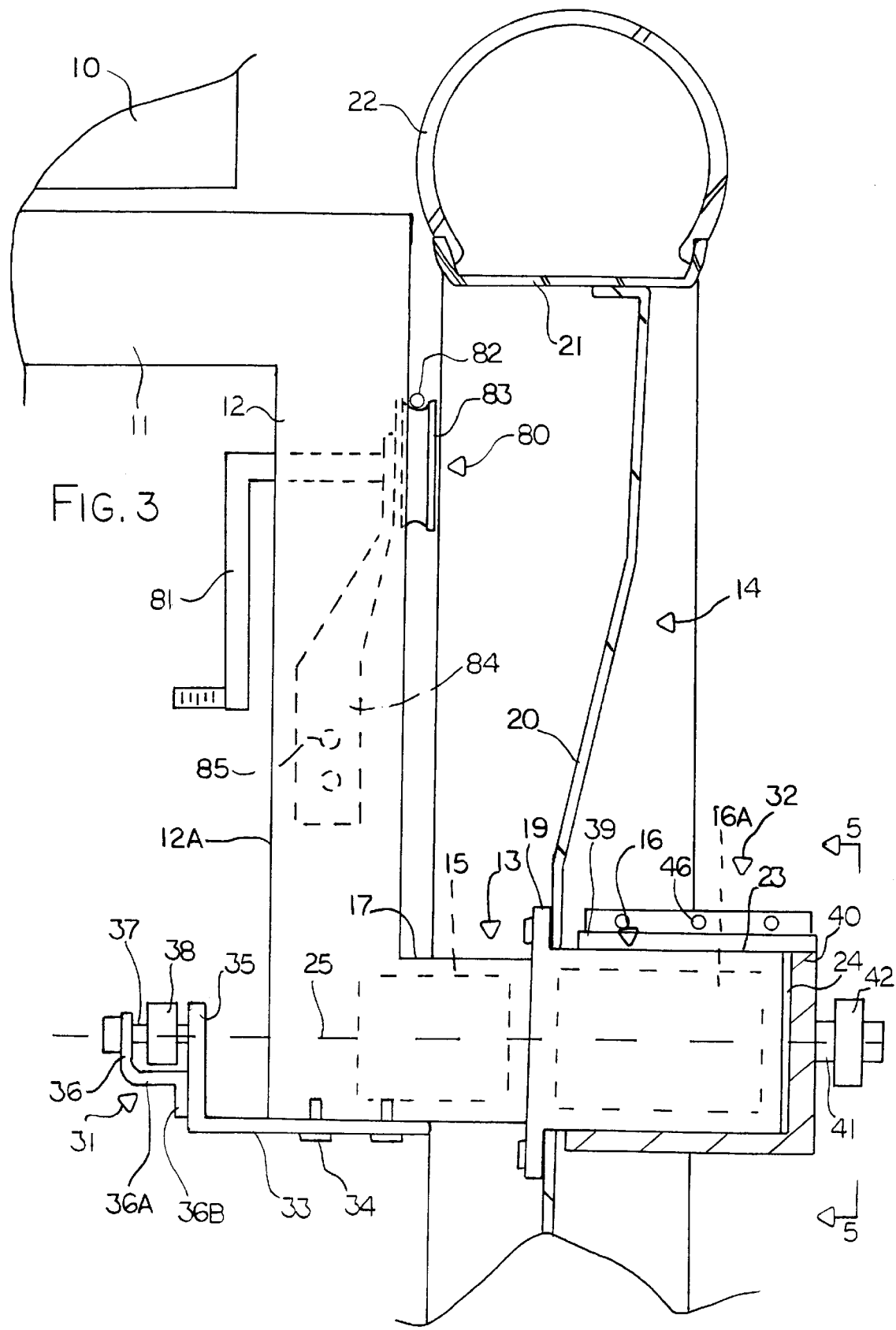
FIG. 3 is a view along the lines 3—3 of FIG. 1.
Figure 4:
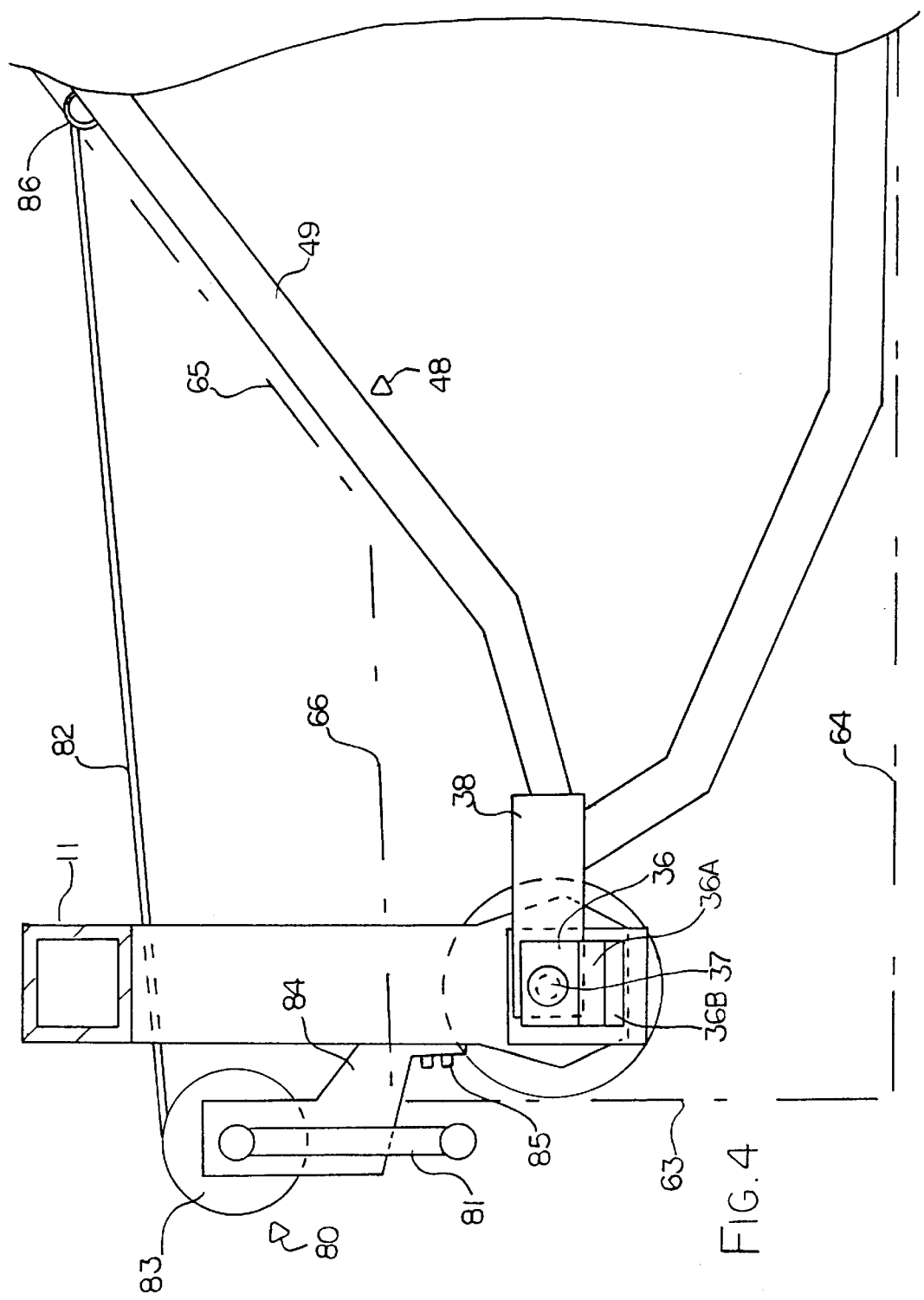
FIG. 4 is a view along the lines 4—4 of FIG. 2.

A conventional high clearance agricultural sprayer is shown in the drawings in part only since this is a well known piece of equipment and various different types of this construction are available from different manufacturers and thus the details will be well known to one skilled in the art. For convenience of the understanding of the present invention, therefore, the agricultural sprayer is shown only in part including a body 10 which is mounted on a pair of horizontal axles one of which is indicated at 11. At each outer end of the axle 11 there is provided a vertical depending portion 12 which extends downwardly from the raised horizontal axle section to a wheel hub structure generally indicated at 13 on which is mounted a ground wheel 14. The horizontal axle section 11 and the vertical section 12 are rigid and are mounted on the body 10 for steering movement using one of the various different types of steering arrangements which are available and are well known to one skilled in the art.

The wheel hub 13 extends outwardly from the vertical section 12 in a direction outwardly from the horizontal section 11. Again the hub section is of a conventional nature and includes a hydraulic drive motor 15 which generates rotation of an outer hub section 16 relative to an inner stationary hub section 18. The outer hub section 16 includes a planetary transmission system 16A which is driven by the motor 15 and converts the high speed rotation of the motor 15 to a low speed rotation of the rotatable hub section 16.

The rotatable hub section 16 includes a flange 19 which is bolted to the annular wheel plate 20 of the ground wheel 14. The wheel includes an outer limb 21 carrying a conventional agricultural ground tire 22.

The rotatable hub section 16 includes a cylindrical body 23 having an end face 24 with an axis of the cylindrical body 23 lying on the axis of rotation 25 of the wheel. The cylindrical body projects outwardly from the wheel plate 20 away from the hub stationery portion 17 so that it is exposed on the outside of the wheel.

The above arrangement is a conventional nature and defines therefore the context of which the present invention is utilized.

A crop divider is mounted on the ground wheel assembly and is generally indicated at 30. The crop divider is arranged to extend forwardly from the ground wheel so as to engage a standing crop in advance of the ground wheel and to divide the standing crop so that it passes either side of the ground wheel thus reducing the amount of the crop which is crushed as the group wheel moves forwardly across the ground.

The crop divider is carried on a first inside bracket 31 and the second outside bracket 32 both of which are mounted at the ground wheel assembly and particularly at the wheel hub.

The inside bracket 31 comprises a horizontal mounting plate 33 bolted to the bottom of the vertical section 12 of the axle by bolts 34. The horizontal plate extends inwardly from the inside fact 12A of the vertical section 12 and includes a vertically upstanding bracket plate 35 spaced inwardly from the inside face 12A. A second vertical plate 36 stands upwardly parallel to the plate 35 and spaced inwardly therefrom such that the plate 36 is welded to a lower part of the plate 35 and includes a horizontal section 36A and a vertical section 36B. The outstanding plates 35 and 36 define a clevis with a transverse pin 37 lying substantially on the axis 25 and defining a pivot pin for an arm 38 extending forwardly from the pin and forming part of the crop divider.

The second bracket 32 comprises a cylindrical sleeve 39 surrounding the cylindrical body and clamp thereto. An end of the sleeve 39 is closed by an end plate 40 which carries a shaft 41 lying on the axis 25 and extending outwardly from the end plate 40. On the shaft 41 is mounted an arm 42 which is carried in bearings 43 relative to the shaft 41 allowing the arm to remain stationary while the shaft 41 and the bracket 32 rotate with the cylindrical housing 16. The cylindrical sleeve 39 is clamped to the cylindrical housing 16 by a pair of upstanding flanges 44 and 45 which are squeezed together by a bolt 46.

The sleeve 39 can thus be simply slipped onto the cylindrical housing 16 and clamped in place by squeezing the bolts 46 thus defining a simple attachment bracket by which the arm 42 is held stationary and supported on the axis 25.

The crop divider 30 is mounted on the arms 38 and 42 and extends forwardly therefrom. The crop divider includes a first frame 47 on one side of the wheel 14 and a second frame 48 on the other side of the wheel. Thus the frame 47 will attach to the arm 42 and the frame 48 is attached to the arm 38. Each frame includes an upper beam 49 which is attached at its end to the forward end of the arm and extends therefrom slightly upwardly to upper apex 50 and then that descends downwardly and forwardly to a forward apex 51. A lower beam 52 is attached to the underside of the arm and extends therefrom downwardly and then in a horizontal section 53 defining a bottom edge of the crop divider. From the forward end 54 of the horizontal section, the beam extends upwardly to the apex 51 where it is connected to the upper beam 49.

The apex 51 is mounted a forwardly extending divider plate 55 in the form of a generally vertical plate having a first section extending forwardly of the crop divider so as to assist in the grasping the crops elements and directing them to one or other side of the crop divider.

From the divider plate 55, the crop divider extends rearwardly and upwardly in an upper edge member 57 so that a forward upper part of the crop divider from the plate 55 to an uppermost apex 58 is closed and defined in effect a single leading edge. The upper edge 57 is defined by a beam which thus provides a stiffening effect for the crop divider.

The frame is covered by two sheets 60 and 61 of a suitable sheet plastics material which thus define sides of the crop divider for engaging the crop and allowing the crop to slide smoothly over the outer surface of the sheets.

Each sheet has a forward apex 62 at the plate 55 and each sheet extends along the proper leading edge 57 to the upper apex 58. From the apex 62 each sheet extends downwardly and rearwardly while diverging from the opposed sheet so that the frames 47 and 48 diverge to respective sides of the wheel and are followed by the sheet which is attached to the beams of the frames by suitable fastener elements (now shown). From the upper apex 58 each sheet diverges away from the opposed sheet and thus extends to a respective side of the wheel 14. Each sheet extends rearwardly to a rear edge 63 which is vertical and spaced rearwardly of the respective bracket so as to cover the bracket and hold the crop in its divided or spaced position on its respective side of the wheel to a position behind the hub of a wheel at which the crop can be released for movement inwardly forwardly the wheel without damaging the crop due to pushing by the wheel. Each sheet includes a horizontal lower edge 64 which extends from the vertical rear edge 63 forwardly to the apex 64. The outer sheet 60 has an upper edge which is inclined of a straight line of apex 58 to the top of the vertical rear edge 63. The inner sheet 61 includes an upper edge which extends in the first straight section 65 downwardly and rearwardly from the apex 58 followed by a horizontal section 66.

A ground wheel 70 is mounted on a hub 71 which is carried on a bracket 72 extending outwardly to the bottom beam 52 of the outer frame 47. Thus the wheel is fixed in position with the hub at the wheel at the bottom of the crop divider defined by the bottom edge of the sheets and by the bottom beams 53. The ground wheel thus is exposed underneath the crop divider and rolls across the ground in front of the wheel 15 and rearwardly of the divider plate 55 and the front apex 62. The crop divider is thus carried by the single front wheel 70 and by the two brackets and particularly the arms 38 and 42 of those brackets. The crop divider is guided by the ground wheel also so that it can be raised and lowered by engagement of the ground wheel with the ground thus effectively following the ground contours in a floating action while the arms 42 and 38 pivot about the axis of the wheel.

In operation, therefore, the crop dividers moves forwardly in front of the wheel and is maintained at the required height for engaging the crop by the engagement of the ground wheel 70 with the ground.

In the event that it is required to raise the crop divider for transportation, there is provided a winch 80 having a manually operable handle 81 for winding a cable 82 onto a reel 83. The winch is mounted on a support bracket 84 which is bolted by bolts 85 onto the rear face of the vertical section 12 of the axle. The cable 82 extends forwardly from the axle to a fastener 86 and the inner frame 48 at a position sufficiently far along the upper beam of that frame to provide sufficient leverage for lifting the crop divider by reeling in the cable onto the winch. Thus manual cranking of the handle 81 will cause the crop divider to pivot about the axis of the wheel 14 on the arms 38 and 42 so that the crop divider is pulled upwardly and rearwardly lifting the ground wheel 70 from the ground and pulling the crop divider to a raised position upwardly of the ground wheel 14 and inclined slightly forward therefrom so that it remains in a stoward position with its weight forward of the axis 25.

The mounting of the crop divider on the inner bracket 31 and on the outer bracket 32 carried on the outer hub of the wheel ensure the stability of the crop divider so that is properly and effectively supported in movement across the ground without danger of bending or distortion and without the necessities for excessively heavy support beams.

The use of the ground wheel provides accurate control of the crop divider so that it has maintained the required height without the danger of being damaged with engagement of the ground should the ground level change significantly forwardly of the wheel 14.

The bracket 32 mounted on the outer rotating hub of the wheel can also be used for mounting other elements than the crop divider so that such elements are properly supported relative to the wheel.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A vehicle wheel assembly comprising:
    a ground wheel having a wheel disc defining an inner side of the wheel and an outer side of the wheel, a wheel rim at a peripheral edge of the wheel disc and a tire mounted on the wheel rim;
    a wheel support assembly on the inner side of the wheel for attachment of the wheel to a vehicle body;

the wheel support assembly being arranged such that the wheel is supported relative to the vehicle body only on the inside;

a wheel hub assembly mounted on the wheel support assembly for mounting the wheel for rotation about a wheel axis, which axis is central of the wheel and passes horizontally through the wheel support assembly;

the wheel hub assembly including a cylindrical housing projecting from the wheel disc to the outer side of the wheel disc with a longitudinal axis of the cylindrical housing lying along the wheel axis, the cylindrical housing having an outer peripheral surface and being arranged to rotate with the wheel about the axis;

a member carried by the wheel assembly;

and a mounting bracket assembly for supporting the member on the wheel, the mounting bracket assembly comprising:

a cylindrical sleeve clamped onto the outer peripheral surface of the cylindrical housing;

a bracket attached to the member;

and a bearing attaching the bracket to the sleeve and allowing rotation of the sleeve with the peripheral surface of the cylindrical housing and the wheel about the wheel axis while the bracket and the member are held against rotation with the wheel.

2. The wheel assembly according to claim 1 wherein the sleeve includes a longitudinal slot and wherein the sleeve is clamped to the outer peripheral surface by clamping members for tightening the sleeve onto the peripheral surface by reducing a width of the slot.

3. The wheel assembly according to claim 1 wherein the sleeve includes an end wall opposite to the wheel disc and generally parallel thereto closing the adjacent end of the sleeve and wherein the bearing is mounted on a shaft carried on the end wall.

4. The wheel assembly according to claim 1 wherein the bracket and the member are held against rotation by a second mounting bracket assembly mounted on the wheel support assembly on the inner side of the wheel such that the mounting bracket assembly and the second mounting bracket assembly both provide support to the member.

5. The wheel assembly according to claim 1 wherein the hub assembly includes a drive assembly for driving the ground wheel including a hydraulic drive motor mounted on the wheel support assembly and a gear transmission, the gear transmission being mounted in the cylindrical housing.

6. A crop divider and wheel assembly for an agricultural vehicle comprising:

a ground wheel having a wheel disc defining an inner side of the wheel and an outer side of the wheel, a wheel rim at a peripheral edge of the wheel disc and a tire mounted on the wheel rim;

a wheel support assembly on the inner side of the wheel for attachment of the wheel to a vehicle body;

a wheel hub assembly mounted on the wheel support assembly for mounting the wheel for rotation about a wheel axis centrally of the wheel and passing horizontally through the wheel support assembly;

the wheel hub assembly including a housing member projecting from the wheel disc to the outer side of the wheel disc;

the crop divider comprising crop engaging surfaces arranged to engage a standing crop in front of the wheel and to deflect the crop to the respective inner and outer sides of the wheel;

and a mounting bracket assembly for supporting the crop divider on the wheel, the mounting bracket assembly comprising:

an attachment member mounted on the housing member;

a first mounting bracket attached to the crop divider;

a bearing attaching the bracket to the attachment member and allowing rotation of the housing member and the wheel about the wheel axis while the bracket and the crop divider do not rotate with the wheel;

and a second mounting bracket mounted on the wheel support assembly on the inner side of the wheel, the crop divider being attached to the second mounting bracket for support thereby.

7. The crop divider and wheel assembly according to claim 6 wherein the second mounting bracket mounts the crop divider for pivotal movement about the wheel axis such that the first mounting bracket and the second mounting bracket both provide support to the crop divider and allow lifting and lowering movement of the crop divider relative to the wheel.

8. The crop divider and wheel assembly according to claim 6 wherein the crop divider includes a leading edge located forwardly of the wheel, said leading edge extending generally upwardly and rearwardly to a position above the wheel and wherein the crop engaging surfaces diverge rearwardly and outwardly from the leading edge.

9. The crop divider and wheel assembly according to claim 6 including a guide plate member mounted at the leading edge and extending forwardly therefrom.

10. The crop divider and wheel assembly according to claim 6 including a subsidiary ground wheel attached to the crop divider forwardly of the ground wheel for supporting the crop divider relative to the ground.

11. The crop divider and wheel assembly according to claim 7 including a lift system for pivotally lifting the crop divider around the wheel axis.

12. The crop divider and wheel assembly according to claim 11 wherein the lift system comprises a cable winch and a cable having an outer end attached to the crop divider for pulling a forward end of the crop divider upwardly and rearwardly.

13. The crop divider and wheel assembly according to claim 6 wherein the housing member is cylindrical with a longitudinal axis of the cylindrical housing member lying along the wheel axis and wherein the attachment member comprises a cylindrical sleeve clamped onto an outer peripheral surface of the cylindrical housing member.

14. The wheel assembly according to claim 13 wherein the sleeve includes a longitudinal slot and is clamped onto the peripheral surface by clamping members for tightening the sleeve onto the peripheral surface by reducing a width of the slot.

15. The wheel assembly according to claim 13 wherein the sleeve includes an end wall opposite to the wheel disc and generally parallel thereto closing the adjacent end of the sleeve and wherein the bearing is mounted on a shaft carried on the end wall.

16. The wheel assembly according to claim 13 wherein the hub assembly includes a drive assembly for driving the ground wheel including a hydraulic drive motor mounted on the wheel support assembly and a gear transmission, the gear transmission being mounted in the cylindrical housing.

17. A crop divider and wheel assembly for an agricultural vehicle comprising:

a ground wheel having a wheel disc defining an inner side of the wheel and an outer side of the wheel, a wheel rim at a peripheral edge of the wheel disc and a tire mounted on the wheel rim;

a wheel support assembly on the inner side of the wheel for attachment of the wheel to a vehicle body;

a wheel hub assembly mounted on the wheel support assembly for mounting the wheel for rotation about a wheel axis centrally of the wheel and passing horizontally through the wheel support assembly;

the crop divider comprising crop engaging surfaces arranged to engage a standing crop in front of the wheel and to deflect the crop to the respective inner and outer sides of the wheel as the wheel moves through the crop;

a mounting bracket assembly for supporting the crop divider on the wheel;

and a subsidiary ground wheel attached to the crop divider forwardly of the ground wheel for supporting the crop divider relative to the ground.

18. The crop divider and wheel assembly according to claim 17 including a lift system for pivotally lifting the crop divider around the wheel axis.

19. The crop divider and wheel assembly according to claim 18 wherein the lift system comprises a cable winch and a cable having an outer end attached to the crop divider for pulling a forward end of the crop divider upwardly and rearwardly.

20. A crop divider and wheel assembly for an agricultural vehicle comprising:

a ground wheel assembly having a wheel disc defining an inner side of the wheel and an outer side of the wheel, a wheel rim at a peripheral edge of the wheel disc and a tire mounted on the wheel rim;

a wheel support assembly on the inner side of the ground wheel assembly for attachment of the ground wheel assembly to a vehicle body for rotation relative thereto;

a wheel hub assembly mounted on the wheel support assembly for mounting the ground wheel assembly for rotation about a wheel axis centrally of the ground wheel assembly and passing horizontally through the wheel support assembly;

the ground wheel assembly including a housing member projecting from the wheel disc to the outer side of the wheel disc;

the crop divider comprising crop engaging surfaces arranged to engage a standing crop in front of the tire and to deflect the crop to the respective inner and outer sides of the tire;

and a mounting bracket assembly for supporting the crop divider comprising:

an attachment member mounted on the ground wheel assembly on the outer side thereof;

a first mounting bracket attached to the crop divider;

a bearing attaching the bracket to the attachment member and allowing rotation of the ground wheel assembly about the wheel axis while the bracket and the crop divider do not rotate with the ground wheel assembly;

a second mounting bracket mounted on the wheel support assembly on the inner side of the ground wheel assembly, the crop divider being attached to the second mounting bracket for support thereby;

the second mounting bracket mounting the crop divider for pivotal movement about the wheel axis such that the first mounting bracket and the second mounting bracket both provide support to the crop divider and allow lifting and lowering movement of the crop divider relative to the ground wheel assembly.

21. The crop divider and wheel assembly according to claim 20 including a subsidiary ground wheel attached to the crop divider forwardly of the ground wheel for supporting the crop divider relative to the ground.

22. The crop divider and wheel assembly according to claim 20 including a lift system for pivotally lifting the crop divider around the wheel axis.

23. The crop divider and wheel assembly according to claim 22 wherein the lift system comprises a cable winch and a cable having an outer end attached to the crop divider for pulling a forward end of the crop divider upwardly and rearwardly.

* * * * *